US011755947B1

(12) United States Patent
Hernandez Munuera et al.

(10) Patent No.: US 11,755,947 B1
(45) Date of Patent: Sep. 12, 2023

(54) OFFLINE EVALUATION OF MACHINE LEARNING MODELS WITH NOISE REDUCTION

(71) Applicant: Amazon Technologies, Inc., Seattle, WA (US)

(72) Inventors: Juan Carlos Hernandez Munuera, Seattle, WA (US); Rizwana Rizia, Bothell, WA (US); Varun Narayan Hegde, Seattle, WA (US); Miguel Angel Hernandez Orozco, Kirkland, WA (US); Arnab Sinha, Issaquah, WA (US); Ravi Khandelwal, Bellevue, WA (US); Lei Shi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 922 days.

(21) Appl. No.: 16/711,212

(22) Filed: Dec. 11, 2019

(51) Int. Cl.
    *G06N 7/00* (2023.01)
    *G06N 20/00* (2019.01)

(52) U.S. Cl.
    CPC ............... *G06N 20/00* (2019.01); *G06N 7/00* (2013.01)

(58) Field of Classification Search
    None
    See application file for complete search history.

(56) References Cited

U.S. PATENT DOCUMENTS

| | | | |
|---|---|---|---|
| 8,965,814 B1 | 2/2015 | Rangan | |
| 9,213,946 B1 * | 12/2015 | Chavira | G06F 16/35 |
| 9,483,387 B1 * | 11/2016 | Allocca | G06F 11/3684 |
| 10,002,329 B2 | 6/2018 | Mehanna et al. | |
| 10,192,172 B2 | 1/2019 | Chan et al. | |
| 10,402,749 B2 | 9/2019 | Aminzadeh et al. | |
| 2016/0275406 A1 * | 9/2016 | Chan | G06F 16/2455 |
| 2017/0185913 A1 * | 6/2017 | Codella | G06N 20/00 |
| 2019/0156153 A1 | 5/2019 | Can et al. | |

OTHER PUBLICATIONS

Alex Deng, et al., "Diluted Treatment Effect Estimation for Trigger Analysis in Online Controlled Experiments", ACM, WSDM'15, Feb. 2-6, 2016, Retrieved from http://dx.doi.org/10.1145/2684822.2685307, pp. 1-10.

* cited by examiner

*Primary Examiner* — Xuyang Xia
(74) *Attorney, Agent, or Firm* — Robert C. Kowert; Kowert, Hood, Munyon, Rankin & Goetzel, P.C.

(57) ABSTRACT

Methods, systems, and computer-readable media for offline evaluation of machine learning models with noise reduction are disclosed. A trigger computation system generates a plurality of experimental requests. The experimental requests do not represent unmodified requests received from clients in a production environment. At least one parameter value varies for individual ones of the experimental requests. The trigger computation system provides the experimental requests to a first machine learning model and a second machine learning model. The first machine learning model and the second machine learning model produce a set of results based at least in part on the experimental requests. The trigger computation system determines a reduced set of results for which the first machine learning model and the second machine learning model differ. An evaluation of the first machine learning model or the second machine learning model is performed using the reduced set of results.

20 Claims, 8 Drawing Sheets

OFFLINE EVALUATION OF MACHINE LEARNING MODELS WITH NOISE REDUCTION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online stores that offer goods and services in an electronic catalog, internet service providers, corporate networks, cloud computing services, web-based hosting services, and so on. A distributed system may include many different computing resources and many different services that interact with one another, e.g., to produce a product detail page that specifies various pieces of information about a catalog item. Some distributed systems may use machine learning models that are trained, tested, and then used to predict future behaviors.

Figure 1A:
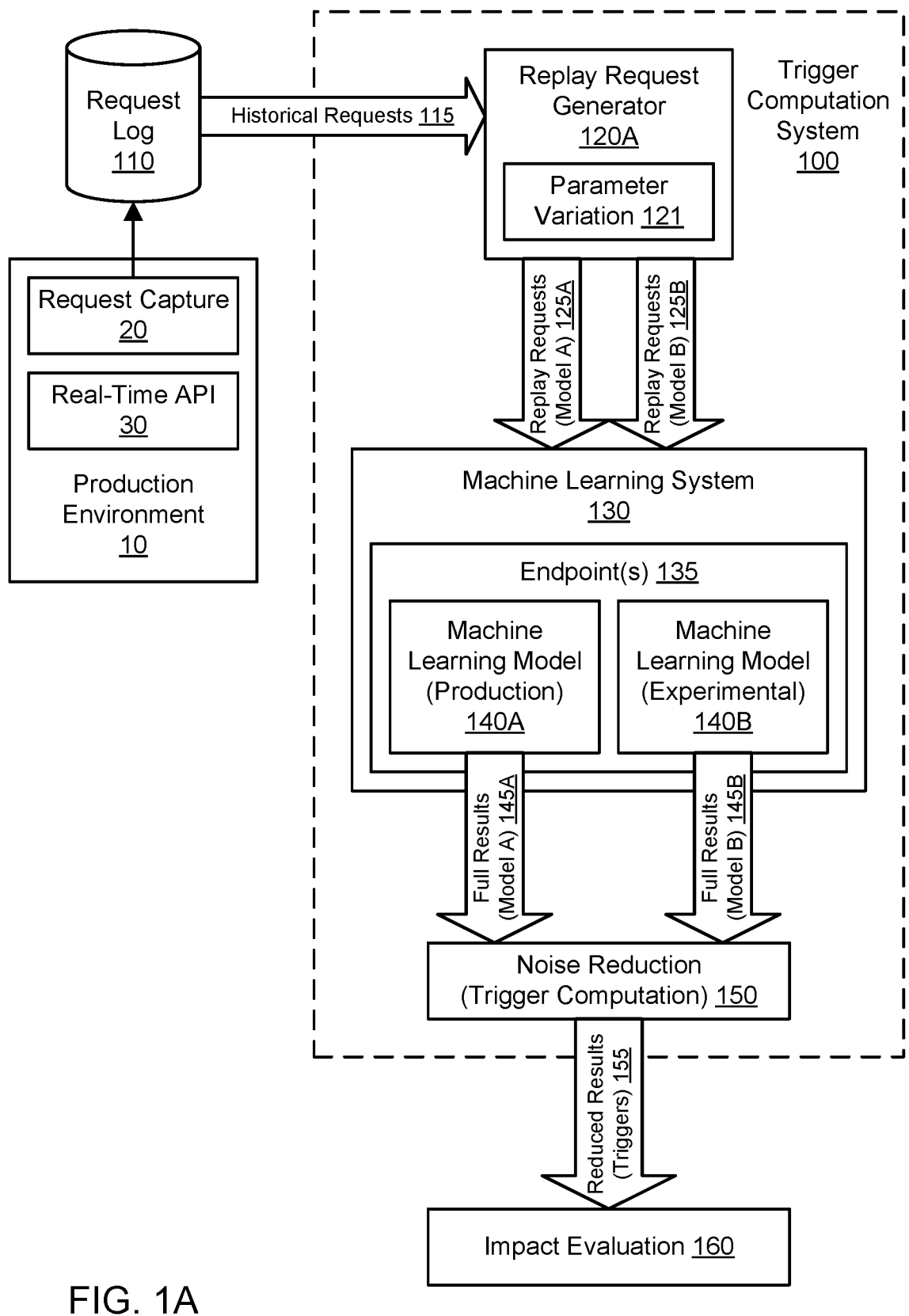
FIG. 1A, FIG. 1B, and FIG. 1C illustrate an example system environment for offline evaluation of machine learning models with noise reduction, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for offline evaluation of machine learning models with noise reduction are described. Machine learning models (e.g., neural networks) and econometric models may be used to support an electronic catalog offering a variety of goods and services to customers. For example, when a customer seeks to view a particular item in the catalog, a distributed system may dynamically build an item-specific and potentially customer-specific detail page that describes the item and its characteristics (e.g., a title, a description, one or more pictures, and specifications of the item). The distributed system may use a machine learning model to select one or more additional items to be indicated on the detail page. The additional item(s) may represent recommendations that are expected to be relevant to the customer's interests. From time to time, a team that maintains the machine learning model may desire to test a new version of the model. Using prior approaches, requests associated with real-time customer traffic (e.g., requests from customers to build detail pages) were routed to the new version of the machine learning model, and the output of that new version could then be compared with output of the earlier version. However, if the new version of the model produced significantly different results than the earlier version, then the customer experience could be negatively impacted. Additionally, the use of highly-available, high-volume computing resources for customer interaction concurrently with machine learning model evaluation could degrade the user experience, e.g., by delaying the generation of product detail pages. Furthermore, even if the new model produced different results for only a small percentage of requests (e.g., from 1% to 5%), the comparison of the two models may have used excessive computing resources from needing to sift through the output of both models for 100% of the requests.

The aforementioned challenges, among others, are addressed by embodiments of the techniques described herein, whereby different logical components are tested concurrently using offline or non-production computing resources in a manner that reduces the amount of outputs used for impact evaluation. Logical components may include machine learning models, executable code for applications or services, configurations of application or services, data sources for applications or services, and so on. For example, a team that develops or manages machine learning models may deploy two (or more) different models to one or more endpoints of a machine learning system. The models may represent a production or control model (e.g., a model that is already in use to serve customer requests in a production environment) and an experimental or treatment model. To test the two models against one another, a system may generate experimental requests that represent offline traffic and do not represent unmodified requests from real-world customers. The experimental requests may include synthetic requests. The experimental requests may include replay requests that are generated using recorded (historical) requests that have been captured in a request log from real-time customer requests to an application programming interface (API). The replay requests may be randomly or pseudo-randomly selected from the request log and then modified with parameter values. For example, the historical requests may be modified to add experimental product identifiers (for an electronic catalog) not present in the log or to add identifiers of specific machine learning models. In some embodiments, the experimental requests may be generated and/or sent to the models by a wrapper around the real-time API. By using replay requests or synthetic requests in a non-production environment instead of real-time requests from customers in a production environment, the impact of the model evaluation on real-world customers may be minimized.

The wrapper (or other component of the system) may send each request (or a model-specific version of each request) to both of the models and receive the outputs of both models for all the requests. The wrapper may identify which requests or product identifiers produced different results between the two models and thus represent "triggers." The wrapper may return the reduced set of results representing these triggers and not the entire set of results from the models. For example, if both models produced the same output for a particular product identifier, then that product identifier may represent a non-trigger and may be excluded from the reduced set of results. The non-trigger data may be excluded from further analysis because it represents "noise" that can be eliminated without affecting an evaluation of a model's impact. In cases where the two models differ for only a small percentage (e.g., 1% to 5%) of requests or corresponding product identifiers, and the electronic catalog includes many millions of items that are tested to compare the two models, then noise reduction for the results may eliminate the need to analyze many millions of product identifiers. The reduced set of results may then be used to evaluate the impact of the experimental model, e.g., using the experimental data as well as historical data to estimate an effect of the new model on customer behavior, and potentially to promote the experimental model to production.

As one skilled in the art will appreciate in light of this disclosure, embodiments may be capable of achieving certain technical advantages, including some or all of the following: (1) reducing the consumption of computing resources (e.g., processors, memory, storage, and/or network bandwidth) by reducing the amount of data used to evaluate the impact of machine learning models and other logical components; (2) reducing the consumption of highly available and high-volume computing resources (e.g., processors, memory, storage, and/or network bandwidth) used for interactions with users (e.g., customers of an electronic catalog) by evaluating machine learning models or other logical components using a different set of less highly available computing resources; (3) reducing the impact of evaluation processes on users (e.g., customers of an electronic catalog) by using recorded or synthetic requests and not real-time requests from users; (4) accelerating the evaluation and comparison of machine learning models or other logical components by permitting concurrent testing of different models or components instead of one at a time; (5) improving the extensibility of evaluation by permitting simulation of models or other logical components not launched into production; (6) improving the accuracy of impact evaluation for a new or experimental machine learning model or logical component by eliminating "noise" in the results of the testing; and so on.

Figure 1B:
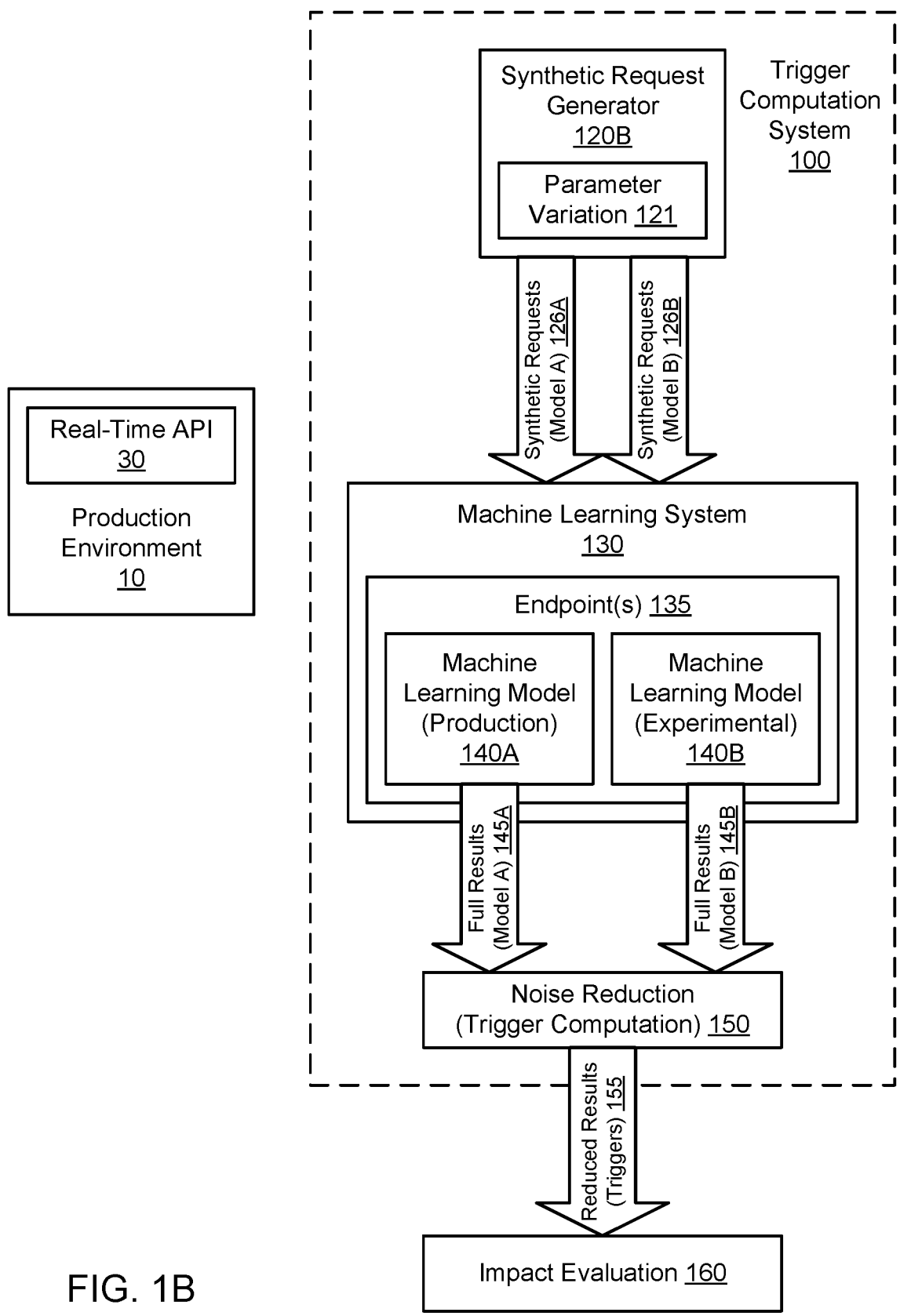
Figure 1C:
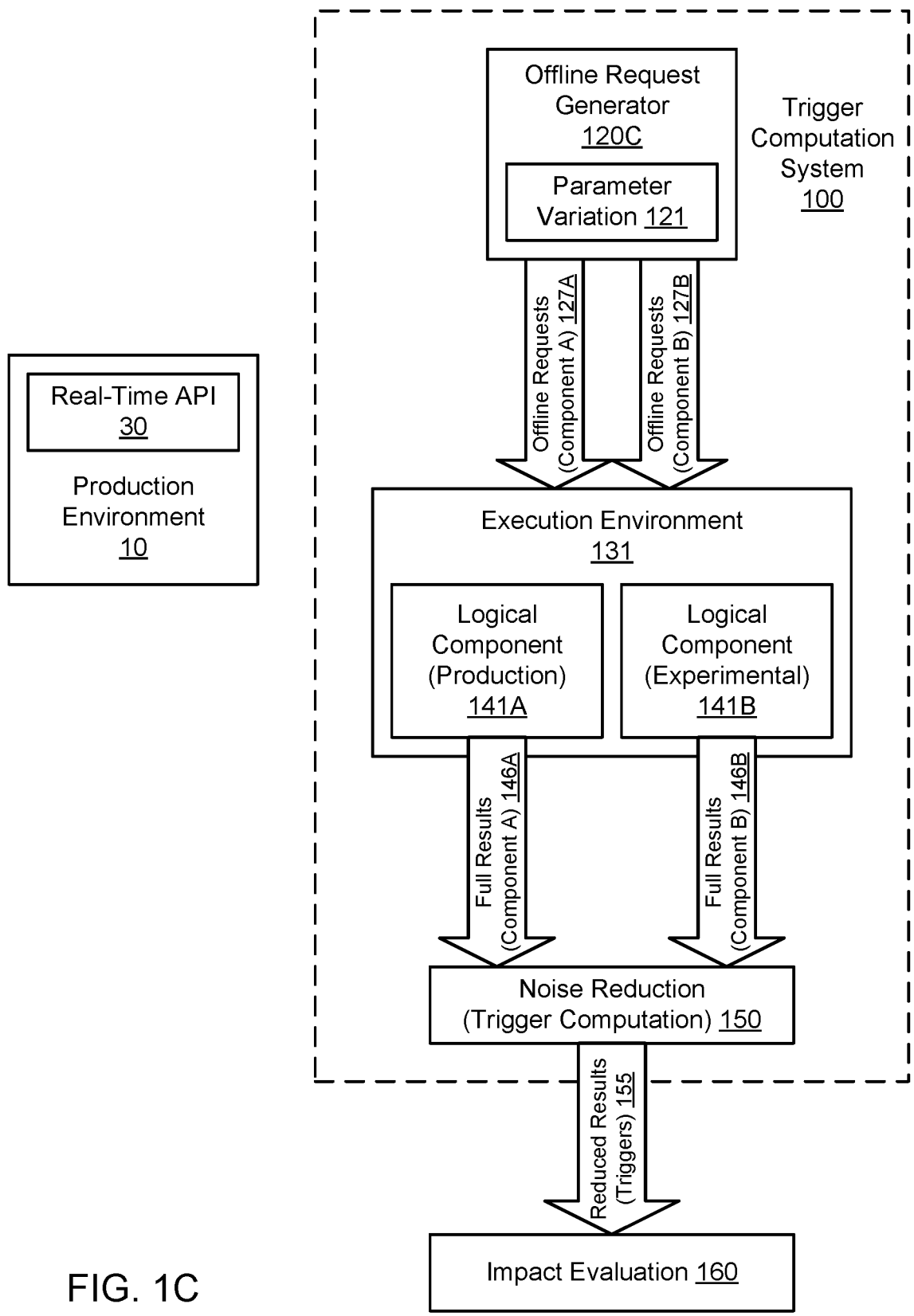

FIG. 1A, FIG. 1B, and FIG. 1C illustrates an example system environment for offline evaluation of machine learning models with noise reduction, according to some embodiments. A trigger computation system 100 may perform tasks associated with offline testing of machine learning models or other logical components or constructs, including computation of "triggers" that produce different results between two machine learning models or other logical components. The machine learning models, such as production model 140A and experimental model 140B, may be tested concurrently in a non-production environment to minimize impact on a production environment 10. The system 100 may produce experimental requests usable to test the performance of two models 140A-140B. Because the models 140A-140B may be tested in a non-production environment using artificially generated or augmented requests rather than real-time requests from customers, the system 100 may be referred to as an offline system. The full results 145A-145B of the testing of the models 140A-140B may be subjected to noise reduction 150 to produce a reduced set of results 155. The reduced set of results 155 may represent "triggers" for different outcomes between the first model 140A and the second model 140B. Using the reduced set of results 155 rather than the full results 145A-145B, an evaluation 160 of the impact of one or more of the models 140A-140B may be performed more efficiently. For example, to determine the impact of an experimental machine learning model 140B on customer behavior for customers of an electronic catalog, the noise reduction 150 may eliminate tens or hundreds of millions of "non-triggered" product identifiers that had the same outputs produced by both the production model 140A and the experimental model. The impact evaluation 160 may instead focus on "triggered" product identifiers for which the outputs of the two models 140A-140B differed. By eliminating a large number of results from the evaluation 160, the trigger computation system may conserve the use of processor resources, memory resources, storage resources, network resources, and so on.

The trigger computation system 100 may be used to support a variety of machine learning use cases such as machine learning associated with an electronic catalog. An electronic catalog may contain millions of descriptions of different items, including products such as goods (tangible and intangible) and services. The catalog may contain many items from many different sellers. Sellers may characterize and differentiate items using titles, descriptive text, images, and so on. A particular item may be associated with a product identifier (ID) that uniquely identifies the item within the catalog. A particular item may be classified in one or more item categories. Categories may be organized in a hierarchy, e.g., with some categories representing root nodes in a tree-like data structure, other categories representing intermediate nodes with both parents and children, and yet other categories representing leaf nodes with no children. Customers may search the electronic catalog using search terms or may browse categories of items in order to identify desired items. To view detailed description of particular items, customers may submit requests (e.g., via web browsers or mobile apps) for product detail pages for those items. Customers may then purchase, rent, lease, or otherwise engage in transactions regarding particular items with sellers of those items.

In some embodiments, the product detail pages may include elements (e.g., panes, widgets, or other user interface elements) that are generated using output of a machine learning model. For example, a product detail page may include a "recommended products" element that is populated using one or more product identifiers output by a machine learning model. In some embodiments, the output of the machine learning model may be specific to a particular product ID, e.g., the product ID associated with the detail page. In some embodiments, the output of the machine learning model may be specific to a particular customer, e.g., customer viewing the detail page. In some embodiments, for example, customers may differ in a registration status (registered or logged in vs. not registered or logged in) and/or a premium status (paid subscriber or premium member vs. not a subscriber or premium member), and the contents of a product detail page may vary based on such customer attributes.

In some embodiments, product detail pages may be built using one or more techniques for machine learning. Machine learning techniques may be implemented using one or more systems that learn from data, identify patterns, and make predictions or other decisions with minimal human intervention (e.g., after human input during an initial configuration phase such as model training). Machine learning may include generating and using one or more models that can programmatically output results based (at least in part) on input. Such a model may undergo a training process (e.g., using a training data set) such that it learns patterns sufficient to make inferences about future events. For example, given one or more inputs such as a product identifier and/or customer attributes, one or more machine learning models may be used to select one or more related product identifiers in a catalog, e.g., such that the selected product(s) are expected to be of interest to customers and may drive customer engagement with the catalog. Machine learning models may include neural network models that are trained to produce inferences. In some embodiments, machine learning models may be deployed to production environments such that they can produce relevant outputs in real-time or near-real-time, e.g., when a customer asks to view a product detail page.

In some embodiments, a machine learning model may be used to optimize the display of a relatively small number of suggested items in a space-constrained user interface element. For example, product identifiers selected by a machine learning model may be used to drive a "suggested purchases" pane or widget on a product detail page associated with the catalog. Such an interface element may improve the experience of customers of the catalog, e.g., by allowing them to discover items of interest while reducing the display of less relevant items.

The request log 110 may store data associated with requests to a real-time application programming interface (API) 30 in a production environment 10 that interacts with real-world clients. The production environment 10 may include a plurality of computing resources (e.g., that implement a service-oriented system or other distributed system), at least some of which interact with end users (e.g., customers of an electronic catalog). A request capture component 20 may intercept or otherwise capture at least some of these interactions as captured requests for storage in the log 110. The captured requests may be referred to as historical requests 115. The historical requests 115 may reflect real-world interactions between clients and a distributed system that uses a machine learning model. For example, one of the historical requests 115 may be generated when a customer seeks to view a product detail page including an element produced using a machine learning model, and the request may indicate or otherwise be associated with a product ID in the catalog and/or one or more attributes of the customer (e.g., premium member, non-premium member, not logged in). The customer attribute(s) may represent a context of the request. The historical requests 115 may represent requests to produce output of a machine learning model, e.g., to select other product identifiers that may be relevant to customers' interests. The historical requests 115 may represent a wide variety of product identifiers or other parameter values that tend to vary from request to request. The historical requests 115 may be captured in the request log 110 over any suitable window of time. The historical requests 115 may be segmented or partitioned according to attributes such as different stores, geographic locations, or regions within the electronic catalog.

In some embodiments, clients who invoke the machine learning model in production 10 may create their own interfaces that convert a uniform resource identifier (URI) to a query and execute the real-time API 30. The interface may be referred to as RESTBinding. When the RESTbinding call is provided to the API 30, the request URI may be stored in the log 110. In some embodiments, URI logs from the top callers to the API 30 may be represented in the log 110. Different logs may be grouped by stores, geographic locations, or regions associated with the electronic catalog.

In some embodiments, the trigger computation system 100 may be invoked according to a schedule or automated workflow, e.g., to perform trigger computation usable for evaluation on a routine basis. In some embodiments, the trigger computation system 100 may be invoked by a user. For example, when a developer or manager of a machine learning model seeks to evaluate the impact of a new (experimental) model 140B in comparison to an existing (production) model 140A or otherwise simulate the performance of multiple models, that person or team may send a request to initiate trigger computation using the trigger computation system 100. The trigger computation system 100 may initiate the computation responsive to the request. In some embodiments, the trigger computation request may indicate or reference the two (or more) machine learning models 140A-140B to be tested concurrently. In some embodiments, the trigger computation request may indicate or reference one or more endpoints 135 of a machine learning system 130 at which the models will be run. In some embodiments, the trigger computation request may indicate or reference a storage location at which outputs of the evaluation should be stored. The models 140A-140B may be run in a non-production environment comprising computing resources that do not necessarily support interactions with real-world customers or other end users associated with the real-time API 30. The models may represent a production or control model (e.g., a model that is already in use to serve customer requests in a production environment) 140A and an experimental or treatment model 140B. The models 140A-140B may represent two different models, two similar models trained with different training data, two similar models with different model parameters (e.g., different weights), and so on. For example, the experimental model 140B may select product identifiers of products that will be delivered to customers by a given date, while the production model 140A may not have such a constraint. The developer or manager may seek to evaluate the performance or impact of a newly developed or refreshed model 140B and compare it against an existing model 140A. The developer or manager may seek to simulate machine learning models using the offline trigger computation system 100 without impacting the customer experience or production resources (e.g., the production environment 10).

To perform the trigger computation, the system 100 may generate offline and experimental requests that represent offline traffic and do not represent unmodified requests received in real-time from real-world customers. As shown in FIG. 1A, using a replay request generator 120A, a plurality of replay requests 125A-125B may be generated for the trigger computation. The replay requests 125A-125B may be generated by a wrapper around the API 30 associated with the historical requests 115 or by a separate service. The replay requests 125A-125B may be generated based (at least in part) on recorded (historical) requests 115 that have been captured in the request log 110. Requests 115 may be randomly or pseudo-randomly selected from the request log 110 and then annotated, modified, or augmented with additional parameter values suitable for testing the two models. For example, the historical requests 115 may be modified to add experimental product identifiers (for the electronic catalog) not present in the log in order to test the machine learning models against newer products. As another example, the historical requests 115 may be modified to add identifiers of the two machine learning models. The requests 125A-125B may be generated using parameter variation 121 such that at least one parameter value (e.g., product ID) may vary for individual ones of the replay requests. In some embodiments, a model identifier (e.g., of the experimental or production models) may vary from request to request so that the machine learning system 130 can direct requests to the appropriate models 140A-140B. A replay request for a given product ID (or other variable) may be provided by the wrapper to both the production (control) model 140A and the experimental (treatment) model 140B in order to evaluate the differences between outputs of the models. In some embodiments, the same product IDs or other variables may be represented in both the replay requests 125A for the first model (A) and the replay requests 125B for the second model (B). However, the replay requests 125A for the first model (A) may include a model identifier for that model 140A, while the replay requests 125B for the second model (B) may include a different model identifier for that model 140B.

As shown in FIG. 1B, using a synthetic request generator 120B, a plurality of synthetic requests 126A-126B may be generated for the trigger computation. The synthetic requests 126A-126B may be generated by a wrapper around the API 30 or by a separate service. The synthetic requests 126A-126B may not necessarily be generated based on recorded (historical) requests 115 that have been captured in the request log 110. Synthetic requests 126A-126B may be generated to include experimental product identifiers (for the electronic catalog) not present in the log in order to test the machine learning models against newer products. Synthetic requests 126A-126B may include identifiers of the two machine learning models. Synthetic requests 126A-126B may be generated using parameter variation 121 such that at least one parameter value (e.g., product ID) may vary for individual ones of the requests. In some embodiments, a model identifier (e.g., of the experimental or production models) may vary from request to request so that the machine learning system 130 can direct requests to the appropriate models 140A-140B. A synthetic request for a given product ID (or other variable) may be provided by the wrapper to both the production (control) model 140A and the experimental (treatment) model 140B in order to evaluate the differences between outputs of the models. In some embodiments, the same product IDs or other variables may be represented in both the synthetic requests 126A for the first model (A) and the synthetic requests 126B for the second model (B). However, the synthetic requests 126A for the first model (A) may include a model identifier for that model 140A, while the synthetic requests 126B for the second model (B) may include a different model identifier for that model 140B.

In some embodiments, the context of requests may be emulated or represented in generating the experimental requests. For example, the context of requests may include a particular segmentation of user accounts (e.g., customers) according to premium members vs. non-premium members. If this segmentation is not represented in the request log 110, or if a different type of customer segmentation is desired by a downstream component, then the wrapper may emulate it by adding appropriate parameter values to requests 125A-125B. In some embodiments, the contextual information may be present in the request log 110 and may be retained in the replay requests 125A-125B. In some embodiments, a mirror image of the RESTBindings represented in the log 110 may be created to encapsulate the contextual information. In some embodiments, synthetic requests may be generated that are not necessarily based on specific historical requests. By using replay requests or synthetic requests in a non-production environment instead of real-time requests from customers in a production environment 10, the impact of the trigger computation and model evaluation on real-world customers may be minimized.

The system 100 (e.g., the wrapper) may receive results produced by using the experimental requests as inputs for the two machine learning models 140A-140B. The full set of results may include results 145A for the first model 140A and results 145B for the second model 140B. The results may indicate outputs of the two machine learning models for the product IDs or other variables of the requests. If the experimental requests vary according to product identifiers, then the full set of results 145A-145B may comprise outputs of the production machine learning model 140A and the experimental machine learning model 140B for individual product identifiers. The results 145A-145B received by the wrapper from the machine learning system 130 may represent results for all of the experimental requests, even if the output of the models did not differ for those requests. In some circumstances, e.g., for millions of product identifiers represented in the replay requests 125A-125B, the full set of results 145A-145B may include a comparable number of results to the requests.

A reduced set of results 155 may be determined using noise reduction (trigger computation) 150. To perform the noise reduction 150, the wrapper may identify which requests, product identifiers, or other variables produced different results between the two models 140A-140B and thus represent "triggers." For example, if product offers recommended by the two models are different for the same requested product ID, then this difference may be recorded as a trigger glanceview, where a triggered product ID has at least one triggered glanceview. The reduced set of results 155 represents a smaller subset of the full results 145A-145B. The reduced set of results 155 may represent a subset of the product identifiers or other variables for which the production machine learning model 140A and the experimental machine learning model 140B produced different outcomes. In some embodiments, the trigger determination may be implemented using the mirror image of the REST-Bindings so that the proper context is observed. In some embodiments, the trigger calculation and/or model evaluation process may be initiated in an automated manner, e.g., according to a schedule.

The full set of results 145A-145B may be reduced by the wrapper, and the reduced set 155 may be provided to the entity that requested the trigger computation. In some embodiments, the reduced set may be stored in a particular storage bucket or other storage resources of a storage service. The developer or manager of the experimental model 140B may retrieve the reduced set of results 155 from this storage service. The wrapper may return the reduced set of results 155 representing these triggers and not the full set of results 145A-145B from the models. For example, if both models produced the same output for a particular product identifier, then that product identifier may represent a non-trigger and may be excluded from the reduced set of results 155. The non-triggered results may be excluded from further analysis because they represent "noise" that can be eliminated without affecting an evaluation of model impact. The reduced set of results 155 may be significantly smaller than the original (unreduced) set of results 145A-145B. The reduced set of results (triggers) 155 may be reported according to different dimensions of the replay requests such as customer segmentation. For example, the triggered product IDs may differ for premium members than for non-premium members, and so two sets of triggers may be reported for the corresponding customer segments, or one set of triggers may be characterized by the customer context attributes. In some embodiments, the reduced set of results 155 may be returned per triggered product ID. In some embodiments, the reduced set of results 155 may be returned in a batch that includes all of the triggered product IDs.

The reduced set of results 155 may be used to perform an evaluation 160 of the impact of the experimental model. Non-triggered results may be excluded from the impact evaluation 160 as a result of the noise reduction 150. For example, in cases where the two models 140A-140B produced different results for only a small percentage (e.g., 1% to 5%) of a billion product identifiers, then noise reduction 150 for the results 145A-145B may eliminate the need to analyze hundreds of millions of product identifiers for model impact. The impact evaluation 160 may evaluate the impact of the experimental model 140B, e.g., using the experimental data as well as historical data to determine whether the differing results of the experimental model result in increased customer engagement, increased sales, increased responses to advertisements, and so on. Based (at least in part) on the impact evaluation 160, a developer or manager of the experimental model 140B may take one or more actions. For example, the experimental model 140B may be modified and tested again, e.g., by using the same techniques against the same production model 140A. As another example, the experimental model 140B may be promoted to the production environment 10 to supplement or replace the production model 140A.

Figure 6:
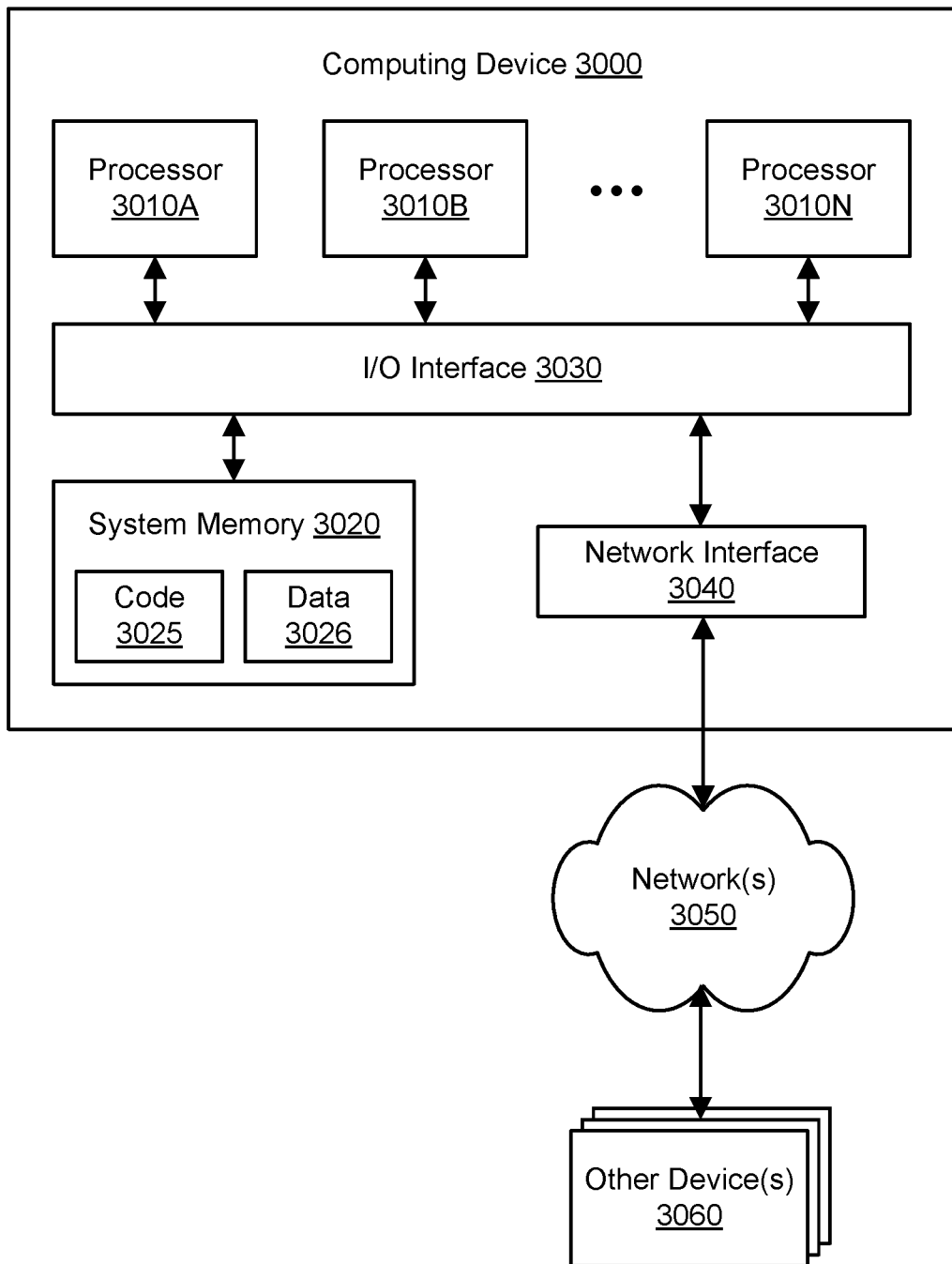
FIG. 6 illustrates an example computing device that may be used in some embodiments.

As shown in FIG. 1C, the trigger computation system 100 may be used to test different logical components concurrently using offline or non-production computing resources in a manner that reduces the amount of outputs used for impact evaluation. Logical components or constructs may include machine learning models (e.g., neural network models), econometric models, executable code for applications or services, configurations of application or services, data sources for applications or services, and other components of the architecture of an application or service. An offline request generator 120C may represent the replay request generator 120A and/or the synthetic request generator 120B and may produce offline requests 127A for a first logical component 141A and offline requests 127B for a second logical component 141B. An execution environment 131 may run program code associated with the two logical components 141A-141B. An execution environment 131 may include or be associated with one or more systems, services, or other components that execution of logical components or constructs. Any of the systems, services, or other components of an execution environment may be built on one or more computing devices such as the example computing device 3000 as illustrated in FIG. 6. The execution environments may vary in terms of their underlying configurations. In one embodiment, the execution environments may include MapReduce-based cluster computing environments, stream processing systems, workflow systems such as Amazon Simple Workflow Service, virtualized computing environments, and other suitable environments. In one embodiment, an execution environment may be implemented using a cluster of computing devices that cooperate to execute tasks (e.g., machine learning tasks). A cluster may be provisioned, launched, or otherwise spun up in order to perform one or more tasks. In one embodiment, a particular execution environment may use an orchestration framework such as Apache Hadoop, Apache Spark, and so on to manage a cluster.

The system 100 (e.g., the wrapper) may receive results produced by using the experimental requests as inputs for the two logical components 141A-141B. The full set of results may include results 146A for the first component 141A and results 146B for the second component 141B. The results may indicate outputs of the two logical components for the product IDs or other variables of the requests. If the experimental requests vary according to product identifiers, then the full set of results 146A-146B may comprise outputs of the production component 141A and the experimental component 141B for individual product identifiers. The results 146A-146B received by the wrapper from the execution environment 131 may represent results for all of the experimental requests, even if the output of the logical components did not differ for those requests. In some circumstances, e.g., for millions of product identifiers represented in the offline requests 127A-127B, the full set of results 146A-146B may include a comparable number of results to the requests. As discussed above, a reduced set of results 155 may be determined using noise reduction (trigger computation) 150. To perform the noise reduction 150, the wrapper may identify which requests, product identifiers, or other variables produced different results between the two logical constructs 141A-141B and thus represent "triggers."

In some embodiments, the triggers 155 may be used for tasks other than impact evaluation 160. For example, a machine learning scientist may use the triggers 155 to drill down into performance differences between two (or more) machine learning models that were tested using the same or similar inputs. In some embodiments, the triggers 155 may be used to determine whether models or logical components are viable for continued experimentation. For example, if a machine learning model or logical component produces different results for 90% of a relatively small number of inputs, then a developer may conclude that the construct is risky and that more extensive testing of the model or component with a large number of inputs would waste resources. Accordingly, the trigger computation system 100 may be used to perform early detection of nonviable constructs in order to conserve computing resources. As another example, if a machine learning model or logical component produces different results for only 1% of a relatively small number of inputs, then a developer may conclude that more extensive testing of the model or component with a large number of inputs is justified. In such a scenario, the experimental construct may be tested further using online traffic from real-world customers in the production environment 10, e.g., by dialing up exposure to the experimental construct over time.

The trigger computation system 100 may be implemented using any suitable number and configuration of computing devices, any of which may be implemented by the example computing device 3000 illustrated in FIG. 6. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more components of the system 100 may be implemented in a service-oriented system in which multiple services collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 may be offered to clients in exchange for fees, or the cost associated with performing a selection of catalog items using the system 100 may be assessed to a responsible entity. In some embodiments, clients of the system 100 may represent different business entities than the entity that operates the system 100.

Components of the system 100 and its clients may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. The provider network may represent a network set up by an entity such as a company or a public-sector organization to provide one or more services (such as various types of network-accessible computing or storage) accessible via the Internet and/or other networks to a distributed set of clients. The provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. Aspects of the provider network may be hosted in the cloud, and the network may be termed a cloud-based provider network.

Figure 2:
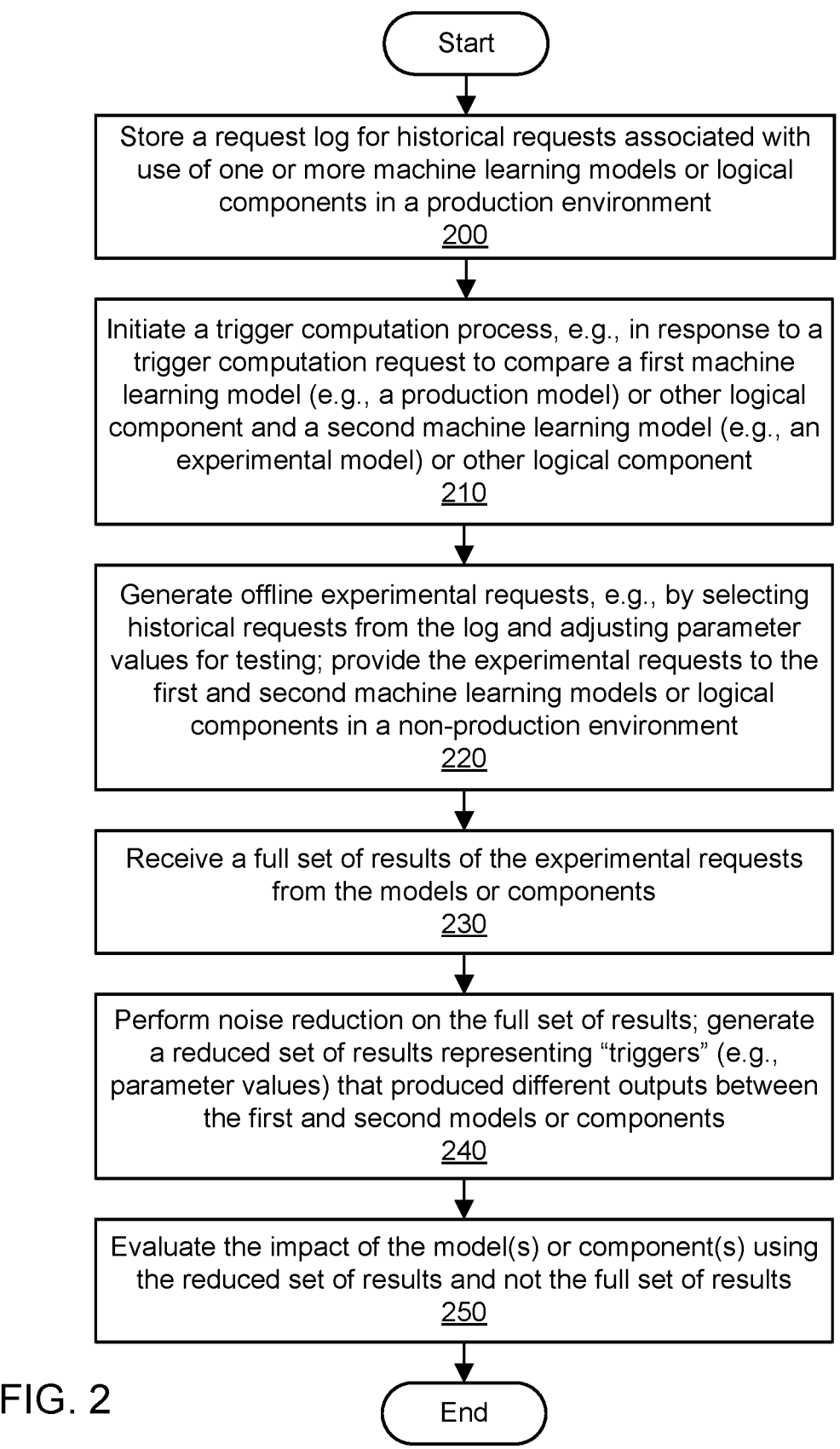
FIG. 2 is a flowchart illustrating a method for offline evaluation of machine learning models with noise reduction, according to some embodiments.

FIG. 2 is a flowchart illustrating a method for offline evaluation of machine learning models with noise reduction, according to some embodiments. As shown in 200, a request log may be stored. The request log may store data associated with requests to an application programming interface (API) in a production environment that interacts with real-world clients. The production environment may include a plurality of computing resources (e.g., that implement a service-oriented system or other distributed system), at least some of which interact with end users (e.g., customers of an electronic catalog). The captured requests may be referred to as historical requests. The historical requests may reflect real-world interactions between clients and a distributed system that uses a machine learning model. For example, one of the historical requests may be generated when a customer seeks to view a product detail page, and the request may indicate or otherwise be associated with a product ID in the catalog and/or one or more attributes of the customer (e.g., premium member, non-premium member, not logged in). The customer attribute(s) may represent a context of the request. The historical requests may represent requests to produce output of a machine learning model, e.g., to select other product identifiers that may be relevant to customers' interests. The historical requests may represent a wide variety of product identifiers or other parameter values that tend to vary from request to request. The historical requests may be captured in the request log over any suitable window of time. The historical requests may be segmented or partitioned according to attributes such as different stores, geographic locations, or regions within the electronic catalog.

As shown in 210, a trigger computation process may be initiated. For example, when a developer or manager of a machine learning model or other logical component seeks to evaluate the impact of a new (experimental) model with respect to an existing (production) model or otherwise simulate the performance of multiple models, that person or team may send a request to perform trigger computation to a trigger computation system. The trigger computation system may initiate the trigger computation responsive to the trigger computation request. In some embodiments, the trigger computation request may indicate or reference the two (or more) machine learning models to be tested concurrently. In some embodiments, the trigger computation request may indicate or reference one or more endpoints of a machine learning system at which the models will be run. The models may be run in a non-production environment comprising computing resources that do not necessarily support interactions with real-world customers or other end users associated with the real-time API. The models may represent a production or control model (e.g., a model that is already in use to serve customer requests in a production environment) and an experimental or treatment model. The models may represent two different models, two similar models trained with different training data, two similar models with different model parameters (e.g., different weights), and so on. For example, the experimental model may select product identifiers of products that will be delivered to customers by a given date, while the production model may not have such a constraint. The developer or manager may seek to evaluate the performance or impact of a newly developed or refreshed model and compare it against an existing model. The developer or manager may seek to simulate machine learning models or other logical components without impacting the customer experience or production resources.

As shown in 220, a plurality of experimental requests may be generated for the trigger computation. The experimental requests may represent offline traffic and not unmodified requests received in real-time from real-world customers. The experimental requests may include synthetic requests and/or replay requests. The replay requests may be generated by a wrapper to the API associated with the historical requests. The replay requests may be generated based (at least in part) on recorded (historical) requests that have been captured in the request log. Requests may be randomly or pseudo-randomly selected from the request log and then annotated or modified with additional parameter values suitable for testing the two models. For example, the historical requests may be modified to add experimental product identifiers (for the electronic catalog) not present in the log in order to test the machine learning models against newer products. As another example, the historical requests may be modified to add identifiers of the two machine learning models. At least one parameter value (e.g., product ID) may vary for individual ones of the replay requests. In some embodiments, a model identifier (e.g., of the experimental or production models) may vary from request to request so that the machine learning system can direct requests to the appropriate models. A replay request for a given product ID (or other variable) may be provided by the wrapper to both the production (control) model and the experimental (treatment) model in order to determine the differences between outputs produced by the models. In some embodiments, the context of requests may be emulated in generating the requests. For example, the context of requests may include a particular segmentation of customers according to premium members vs. non-premium members. If this segmentation is not represented in the request log, the wrapper may emulate it by adding appropriate parameter values to requests. In some embodiments, the contextual information may be present in the request log and may be retained in the replay requests. In some embodiments, synthetic requests may be generated that are not necessarily based on specific historical requests. By using replay requests or synthetic requests in a non-production environment instead of real-time requests from customers in a production environment, the impact of the experimental requests that represent offline traffic and do not represent unmodified requests from real-world customers on real-world customers may be minimized.

As shown in 230, results of the replay requests may be received from the two machine learning models. The results may indicate outputs of the two machine learning models or logical components for the product IDs or other variables of the requests. If the replay requests vary according to product identifiers, then the set of results may comprise outputs of the production machine learning model or logical component and the experimental machine learning model or logical component for individual product identifiers. The results received in 230 may represent results for all of the replay requests, even if the output of the models or components did not differ for those requests.

As shown in 240, a reduced set of results may be determined using noise reduction. The wrapper may identify which requests, product identifiers, or other variables produced different results between the two models or components and thus represent "triggers." The reduced set of results may represent a subset of the results received in 230. The reduced set of results may represent a subset of the product identifiers or other variables for which the production machine learning model or other logical component and the experimental machine learning model or other logical component differ. The set of results may be reduced by the wrapper, and the reduced set may be provided to the entity that requested the trigger computation. In some embodiments, the reduced set may be stored in a particular storage bucket or other storage resources of a storage service. The developer or manager of the experimental model or other logical component may retrieve the reduced set of results from this storage service. The wrapper may return the reduced set of results representing these triggers and not the entire set of results from the models or other logical components. For example, if both models produced the same output for a particular product identifier, then that product identifier may represent a non-trigger and may be excluded from the reduced set of results. The non-triggered results may be excluded from further analysis because they represent "noise" that can be eliminated without affecting an evaluation of the impact of a new model or other logical component. The reduced set of results may be significantly smaller than the original (unreduced) set of results. The reduced set of results (triggers) may be reported according to different dimensions of the replay requests. For example, the triggered product IDs may differ for premium members than for non-premium members, and so two sets of triggers may be reported for the corresponding customer segments, or one set of triggers may be characterized by the customer context attributes. In some embodiments, the reduced set of results may be returned per triggered product ID. In some embodiments, the reduced set of results may be returned in a batch that includes all of the triggered product IDs.

As shown in 250, the reduced set of results may be used to perform an evaluation of the impact of the experimental model or other logical component. Non-triggered results may be excluded from the impact evaluation as a result of the noise reduction performed in 240. In cases where the two models or other logical components differ for only a small percentage (e.g., 1% to 5%) of a billion product identifiers, then noise reduction for the results may eliminate the need to analyze hundreds of millions of product identifiers. The impact evaluation may evaluate the impact of the experimental model or other logical component, e.g., using the experimental data as well as historical data to determine whether the differing results of the experimental model result in increased customer engagement, increased sales, increased responses to advertisements, and so on. Based (at least in part) on the impact evaluation, a developer or manager of the experimental model or other logical component may take one or more actions. For example, the experimental model may be modified and tested again, e.g., by using the same techniques against the same production model. As another example, the experimental model may be promoted to the production environment to replace the production model.

Figure 3:
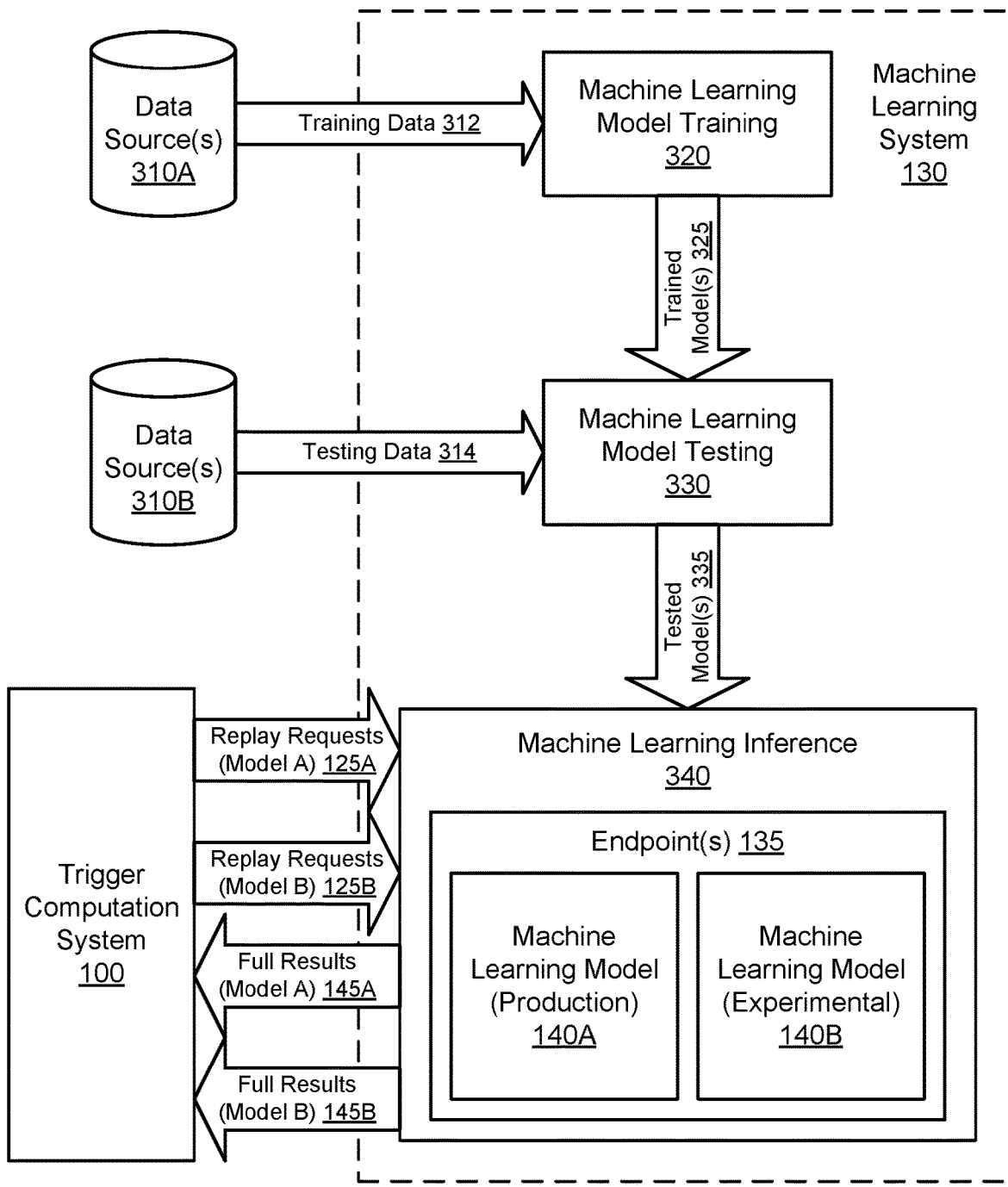
FIG. 3 illustrates further aspects of the example system environment for offline evaluation of machine learning models with noise reduction, including a machine learning system usable to deploy and evaluate different machine learning models concurrently, according to some embodiments.

FIG. 3 illustrates further aspects of the example system environment for offline evaluation of machine learning models with noise reduction, including a machine learning system usable to deploy multiple machine learning models, according to some embodiments. A machine learning system 130 may manage the use of machine learning models such as models 140A-140B on behalf of clients. A machine learning model may be associated with three stages or phases: a training phase where the model is trained, a testing phase where the model is tested, and an inference phase where the model is applied to live data to produce inferences (predictions). In various embodiments, the machine learning system 130 may perform machine learning model training tasks 320, machine learning model testing tasks 330, and machine learning inference tasks 340. The machine learning model training 320 may utilize training data 312 from one or more data sources 310A and may produce one or more trained models 325. The machine learning model testing 330 may test the trained model 325 using testing data 314 from one or more data sources 310B and may produce one or more tested models 335 such as model 140A and/or model 140B. The machine learning inference system 340 may apply the models 140A-140B to replay requests 125A-125B in order to produce inference output 145A-145B for both models.

For example, the inference system 340 may use a model to determine the likelihood of particular users clicking on particular advertisements in a web browser or other internet-enabled interface. The input to such a model may represent unique user identifiers, user demographic information, ad click histories for individual users, and so on. The inferences produced by such a model may represent probability values or labels. As another example, the inference system 340 may use a model to determine whether to offer home loans to applicants. The input to such a model may represent unique user identifiers, user income data, user credit histories, and so on. The inferences produced by such a model may represent scores indicative of the attractiveness of individual applicants for the loans. As another example, the inference system 340 may use a model to determine which products to recommend. The input to such a model may represent unique user identifiers, product identifiers of products the users are viewing, and so on. The inferences produced by such a model may represent recommended product identifiers or scores indicative of the similarity of products to other products.

In some embodiments, a machine learning model may be associated with a collection of weights trained against a corpus of data, which has "learned" how to apply those weights to classify or interpret a new sample of data. A trained model may be created through an automated process (e.g., training 320) but may also be constructed by hand in a number of ways, such as by directly implementing code, by computing and manually entering parameterization, and so on. A machine learning model may be accompanied by a ruleset that interprets the model scores. A ruleset may consume a vector of features and produce a new vector (often a small one, e.g., containing only a single entry).

Data sources 310A and 310B may include one or more database systems, data stores, tables, repositories, storage services, sources of streaming data, servers, memory locations, and so on. The training data 312 may be gathered by users or automated systems and used as input to an initial machine learning model to prepare the model to produce predictions. The training data 312 may be formatted according to a schema using a transformation task. Similarly, the testing data 314 may be gathered by users or automated systems and used as input to a trained machine learning model 325 to verify that the model produces correct inferences. The testing data 314 may also be formatted according to the schema using a transformation task. The replay requests 125A-125B may represent inference input data used as input to the machine learning models 140A-140B to produce predictions about real-world behavior. The inference data may also be formatted according to the schema using a transformation task.

The training 320, testing 330, and inference 340 phases may be implemented in the same execution environment or in different execution environments. For example, in one embodiment, a unified machine learning framework may perform the training 320, testing 330, and inference 340 in a hosted environment on behalf of clients. In some embodiments, training 320 and/or testing tasks 330 may be performed by clients to produce a model, and that model may be used to produce inferences in a hosted environment on behalf of a client. In some embodiments, the training 320 and/or testing tasks 330 may be performed in a hosted environment on behalf of a client, and the inference tasks 340 may be performed in an external environment (e.g., using client-hosted servers or using another machine learning framework). Any of the training 320, testing 330, and inference 340 components may represent individual systems or subsystems that are loosely coupled or decoupled from one another.

The inference system 340 may include a plurality of endpoints such as endpoint(s) 135. Each of the endpoints may host one or more machine learning models that are used to generate inferences. Each of the endpoints may include one or more hosts or servers that perform inference tasks. The endpoints may be largely independent of one another such that the performance of one endpoint may not necessarily affect the operation of another endpoint. The endpoint(s) 135 may apply machine learning models 140A-140B to inference input data from the replay requests 125A-125B in order to generate inference output 145A-145B. The inferences may be produced in substantially real-time, e.g., with minimal delays after the gathering of the inference input data. The inferences may be usable by another component to make decisions. For example, if the inferences represent probability values or labels for the likelihood of particular users clicking on particular advertisements in a web browser, then the other component may represent a web server that generates particular advertisements for particular users. As another example, if the inferences represent scores indicative of the attractiveness of individual applicants for loans, then the other component may represent a loan system that generates loan offers or approves applications for loans.

Figure 4:
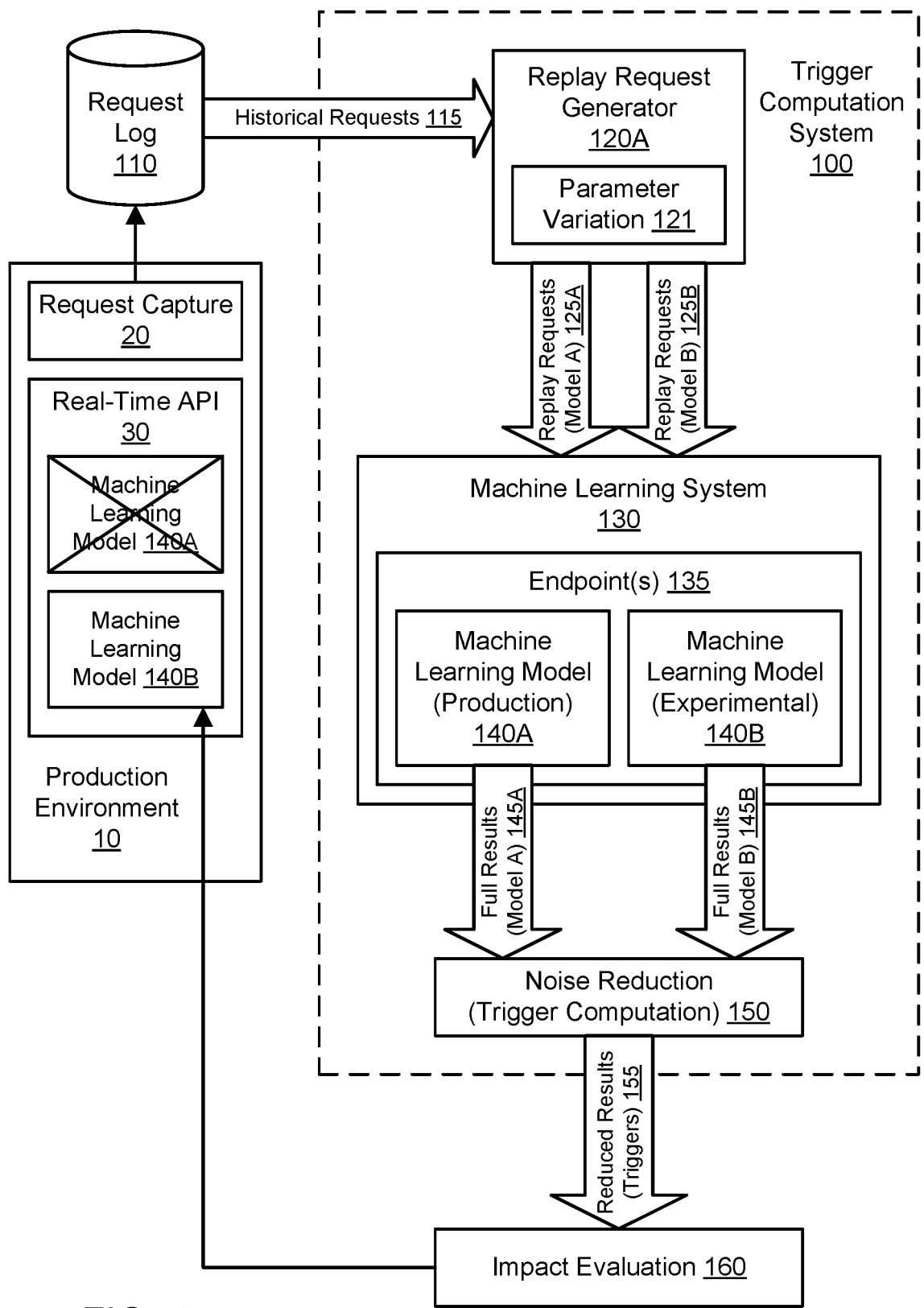
FIG. 4 illustrates further aspects of the example system environment for offline evaluation of machine learning models with noise reduction, including promotion of an experimental model to production, according to some embodiments.

FIG. 4 illustrates further aspects of the example system environment for offline evaluation of machine learning models with noise reduction, including promotion of an experimental model to production, according to some embodiments. As discussed above, the impact evaluation 160 may evaluate the impact of the experimental model 140B, e.g., using the experimental data as well as historical data to determine whether the differing results of the experimental model result in increased customer engagement, increased sales, increased responses to advertisements, and so on. Based (at least in part) on the impact evaluation 160, a developer or manager of the experimental model or other logical component may take one or more actions. As shown in the example of FIG. 4, the experimental model 140B (or other logical component) may be promoted to the production environment 10 to replace the production model 140A (or other logical component) after the impact evaluation 160 determines that the experimental model has a superior performance in terms of customer engagement or some other metric.

Figure 5:
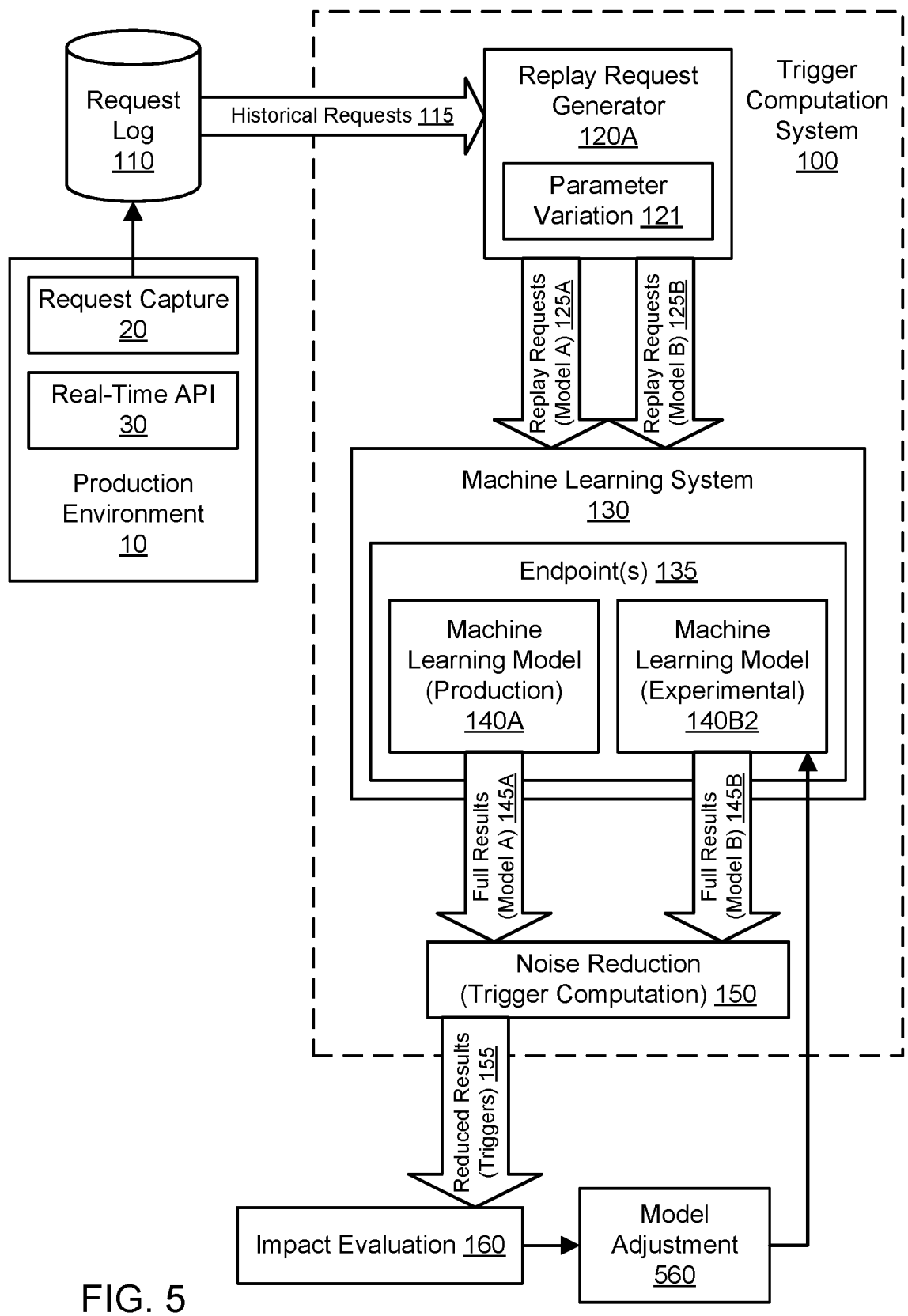
FIG. 5 illustrates further aspects of the example system environment for offline evaluation of machine learning models with noise reduction, including adjustment and re-evaluation of an experimental model, according to some embodiments.

FIG. 5 illustrates further aspects of the example system environment for offline evaluation of machine learning models with noise reduction, including adjustment and re-evaluation of an experimental model, according to some embodiments. As discussed above, the impact evaluation 160 may evaluate the impact of the experimental model 140B, e.g., using the experimental data as well as historical data to determine whether the differing results of the experimental model result in increased customer engagement, increased sales, increased responses to advertisements, and so on. Based (at least in part) on the impact evaluation 160, a developer or manager of the experimental model or other logical component may take one or more actions. As shown in the example of FIG. 5, model adjustment 560 may be performed for the experimental model 140B (or other logical component) to produce an adjusted experimental model 140B2. The adjusted model 140B2 may represent different model weights or other attributes in comparison to the model 140B. The adjusted model 140B2 may be generated after the impact evaluation 160 determines that the experimental model 140B (or other logical component) has an inferior performance in terms of customer engagement or some other metric. The adjusted model 140B2 may then be tested using the trigger computation system 100, e.g., as described in FIG. 1A and FIG. 1B.

Illustrative Computer System

In at least some embodiments, a computer system that implements a portion or all of one or more of the technologies described herein may include a computer system that includes or is configured to access one or more computer-readable media. FIG. 6 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising: one or more processors and one or more memories to store computer-executable instructions that, when executed, cause the one or more processors to:
   store a request log representing a plurality of historical requests to an application programming interface (API) in a production environment;
   generate a plurality of replay requests based at least in part on the plurality of historical requests in the request log, wherein at least one parameter value varies for individual ones of the plurality of replay requests;
   provide the plurality of replay requests to a production machine learning model that has been used to serve requests in a production environment and an experimental machine learning model, wherein the production machine learning model and the experimental machine learning model produce a set of results based at least in part on the plurality of replay requests;
   determine a reduced set of results for which the production machine learning model and the experimental machine learning model differ; and
   perform an evaluation of an impact of the experimental machine learning model using the reduced set of results and not using another subset of the results for which the production machine learning model and the experimental machine learning model did not differ.

2. The system as recited in claim 1, wherein the at least one parameter value that varies for individual ones of the plurality of replay requests comprises a plurality of product identifiers in an electronic catalog, wherein the set of results comprises outputs of the production machine learning model and the experimental machine learning model for individual ones of the product identifiers, wherein the reduced set of results represents a subset of the product identifiers for which the outputs of the production machine learning model and the experimental machine learning model differ, and wherein the subset of the product identifiers is smaller than the plurality of product identifiers.

3. The system as recited in claim 1, wherein the plurality of replay requests are provided to the production machine learning model and the experimental machine learning model by a wrapper around the API, and wherein the reduced set of results is determined by the wrapper.

4. The system as recited in claim 1, wherein the production machine learning model and the experimental machine learning model produce the set of results in a non-production environment, and wherein the one or more memories store additional computer-executable instructions that, when executed, cause the one or more processors to:

deploy the experimental machine learning model to the production environment based at least in part on the evaluation of the impact of the experimental machine learning model using the reduced set of results.

5. A computer-implemented method, comprising: generating, by a trigger computation system, a plurality of experimental requests, wherein at least a portion of the plurality of experimental requests do not represent unmodified requests received from clients in a production environment, and wherein at least one parameter value varies for individual ones of the plurality of experimental requests;

providing, by the trigger computation system, the plurality of experimental requests to a first machine learning model and a second machine learning model, wherein the first machine learning model and the second machine learning model produce a set of results based at least in part on the plurality of experimental requests; and determining, by the trigger computation system, a reduced set of results for which the first machine learning model and the second machine learning model differ, wherein an evaluation of the first machine learning model or the second machine learning model is performed using the reduced set of results.

6. The method as recited in claim 5, wherein the at least one parameter value that varies for individual ones of the plurality of experimental requests comprises a plurality of product identifiers in an electronic catalog, wherein the set of results comprises outputs of the first machine learning model and the second machine learning model for individual ones of the product identifiers, wherein the reduced set of results represents a subset of the product identifiers for which the outputs of the first machine learning model and the second machine learning model differ, and wherein the subset of the product identifiers is smaller than the plurality of product identifiers.

7. The method as recited in claim 5, wherein the plurality of experimental requests comprise replay requests determined based at least in part on historical requests in a request log, wherein the historical requests represent requests from the clients to an application programming interface (API) in the production environment, wherein the first machine learning model represents a production machine learning model used in the production environment, wherein the second machine learning model represents an experimental machine learning model, wherein the first machine learning model and the second machine learning model produce the set of results in a non-production environment, and wherein the second machine learning model is deployed to the production environment based at least in part on the evaluation of the second machine learning model.

8. The method as recited in claim 5, wherein the plurality of experimental requests comprise a context based at least in part on contextual data stored in the request log.

9. The method as recited in claim 5, wherein the plurality of experimental requests comprise replay requests determined based at least in part on historical requests in a request log, wherein generating the plurality of experimental requests comprises adding one or more experimental product identifiers to the historical requests, and wherein the one or more experimental product identifiers are not represented in the request log.

10. The method as recited in claim 5, wherein the plurality of experimental requests comprise replay requests determined based at least in part on historical requests in a request log, and wherein generating the plurality of experimental requests comprises, for an individual one of the experimental requests, adding an identifier of the second machine learning model to one of the historical requests.

11. The method as recited in claim 5, wherein the plurality of experimental requests comprise replay requests determined based at least in part on historical requests in a request log, and wherein generating the plurality of experimental requests comprises, for an individual one of the plurality of experimental requests, randomly or pseudo-randomly selecting one of the historical requests from the log and modifying the one of the historical requests with one or more parameter values.

12. The method as recited in claim 5, further comprising: sending, to a client of the trigger computation system, data indicative of the reduced set of results according to one or more dimensions of the plurality of experimental requests, wherein the one or more dimensions a segmentation of user accounts.

13. One or more non-transitory computer-readable storage media storing program instructions that, when executed on or across one or more processors, perform:

generating a plurality of replay requests based at least in part on a request log comprising a plurality of historical requests from clients in a production environment, wherein at least one parameter value varies for individual ones of the plurality of replay requests;

providing, by a wrapper to an API, the plurality of replay requests to a first logical component and a second logical component, wherein the first logical component and the second logical component produce a set of results based at least in part on the plurality of replay requests; and determining, by the wrapper to the API, a reduced set of results for which the first logical component and the second logical component differ, wherein an evaluation of the first logical component or the second logical component is performed using the reduced set of results.

14. The one or more non-transitory computer-readable storage media as recited in claim 13, wherein the at least one parameter value that varies for individual ones of the plurality of replay requests comprises a plurality of product identifiers in an electronic catalog, wherein the set of results comprises outputs of the first logical component and the second logical component for individual ones of the product identifiers, wherein the reduced set of results represents a subset of the product identifiers for which the outputs of the first logical component and the second logical component differ, and wherein the subset of the product identifiers is smaller than the plurality of product identifiers.

15. The one or more non-transitory computer-readable storage media as recited in claim 13, wherein the plurality of historical requests represent requests to the API in a production environment, wherein the first logical component and the second logical component produce the set of results in a non-production environment, and wherein the second logical component is deployed to the production environment based at least in part on the evaluation of the second logical component.

16. The one or more non-transitory computer-readable storage media as recited in claim 13, wherein the first logical component comprises a first set of program code, and wherein the second logical component comprises a second set of program code.

17. The one or more non-transitory computer-readable storage media as recited in claim 13, wherein the first logical component comprises a first configuration of an application, and wherein the second logical component comprises a second configuration of the application.

18. The one or more non-transitory computer-readable storage media as recited in claim 13, wherein the first logical component comprises a first data source for an application code, and wherein the second logical component comprises a second data source for the application.

19. The one or more non-transitory computer-readable storage media as recited in claim 13, wherein generating the plurality of replay requests comprises, for an individual one of the plurality of replay requests, randomly or pseudo-randomly selecting one of the plurality of historical requests from the log and modifying the one of the plurality of historical requests with one or more parameter values.

20. The one or more non-transitory computer-readable storage media as recited in claim 13, wherein the reduced set of results represents a plurality of product identifiers in an electronic catalog for which the first logical component and the second logical component produced different outputs.

* * * * *